(12) United States Patent
Matsui et al.

(10) Patent No.: US 9,304,362 B2
(45) Date of Patent: Apr. 5, 2016

(54) LIQUID CRYSTAL DISPLAY DEVICE

(71) Applicant: Japan Display Inc., Tokyo (JP)

(72) Inventors: Chikae Matsui, Mobara (JP); Masanao Yamamoto, Mobara (JP); Noboru Kunimatsu, Chiba (JP); Hidehiro Sonoda, Mobara (JP)

(73) Assignee: Japan Display Inc., Tokyo (JP)

( * ) Notice: Subject to any disclaimer, the term of this patent is extended or adjusted under 35 U.S.C. 154(b) by 199 days.

(21) Appl. No.: 13/964,133

(22) Filed: Aug. 12, 2013

(65) Prior Publication Data

US 2014/0055701 A1 Feb. 27, 2014

(30) Foreign Application Priority Data

Aug. 23, 2012 (JP) ................. 2012-183705

(51) Int. Cl.
| | |
|---|---|
| *G02F 1/1343* | (2006.01) |
| *G02F 1/1333* | (2006.01) |
| *G02F 1/136* | (2006.01) |
| *G02F 1/1362* | (2006.01) |

(52) U.S. Cl.
CPC .......... *G02F 1/134309* (2013.01); *G02F 1/136* (2013.01); *G02F 1/1333* (2013.01); *G02F 2001/133397* (2013.01); *G02F 2001/134372* (2013.01); *G02F 2001/136222* (2013.01)

(58) Field of Classification Search
CPC ........ G02F 2001/133397; G02F 2001/134372; G02F 1/134309; G02F 1/1333; G02F 1/136; G02F 2001/136222
See application file for complete search history.

(56) References Cited

U.S. PATENT DOCUMENTS

| | | | | |
|---|---|---|---|---|
| 5,847,410 | A * | 12/1998 | Nakajima | .......... G02F 1/13439 257/59 |
| 6,365,917 | B1 * | 4/2002 | Yamazaki | ....................... 257/72 |
| 2002/0101555 | A1 * | 8/2002 | Kurahashi et al. | ............ 349/138 |

(Continued)

FOREIGN PATENT DOCUMENTS

| | | |
|---|---|---|
| JP | 2011-237571 | 11/2011 |
| KR | 10-2001-0108998 A | 12/2001 |
| KR | 10-2009-0060176 | 11/2009 |

OTHER PUBLICATIONS

Korean Office Action for Korean Patent Application No. 10-2013-98409, issued on Aug. 14, 2014.

(Continued)

*Primary Examiner* — Dennis Y Kim
(74) *Attorney, Agent, or Firm* — TYPHA IP LLC (57) ABSTRACT

In a liquid crystal display device including: TFT substrate; color filter; counter electrode; interlayer insulation film; pixel electrode; alignment film; liquid crystal layer; counter substrate; and Si semiconductor layer. The color filter, counter electrode, interlayer insulation film, pixel electrode, and alignment film being formed on the side where the TFT substrate is provided, the counter substrate being disposed in facing relation to the TFT substrate with the liquid crystal layer put between the counter substrate and TFT substrate, the Si semiconductor layer is formed between the pixel electrode and interlayer insulation film. Even when light from a backlight is absorbed by the color filter and sufficient light cannot reach the alignment film, electric charges accumulated on the alignment film can escape to the pixel electrode in an early stage by the Si semiconductor layer formed under the alignment film, thereby capable of erasing the afterimage in an early stage.

5 Claims, 6 Drawing Sheets

(56) References Cited

U.S. PATENT DOCUMENTS

| | | | |
|---|---|---|---|
| 2009/0087593 A1* | 4/2009 | Kondo | G02B 1/105 428/1.31 |
| 2009/0122247 A1* | 5/2009 | Chang | 349/139 |
| 2009/0256150 A1* | 10/2009 | Yoon | H01L 27/0248 257/57 |
| 2011/0273649 A1 | 11/2011 | Matsui et al. | |
| 2012/0133856 A1* | 5/2012 | Ono | 349/42 |

OTHER PUBLICATIONS

Office Action dated on May 1, 2015 regarding a counterpart Korean patent application No. 10-2013-0098409.

* cited by examiner

| BL-off | ~$10^{14}$ Ω·cm |
|---|---|
| BL-on | ~$10^{12}$ Ω·cm |

| R-PIXEL, G-PIXEL | $\sim 10^{14}\,\Omega\cdot cm$ |
|---|---|
| B-PIXEL | $\sim 10^{12}\,\Omega\cdot cm$ |

LIQUID CRYSTAL DISPLAY DEVICE

CLAIM OF PRIORITY

The present application claims priority from Japanese Patent Application JP 2012-183705 filed on Aug. 23, 2012, the content of which is hereby incorporated by reference into this application.

BACKGROUND OF THE INVENTION

1. Field of the Invention

The present invention relates to a display device. More particularly, the invention relates to a liquid crystal display device in which a countermeasure against afterimage phenomenon is taken, with the afterimage phenomenon occurring when a color filter is formed over a substrate where a pixel electrode is formed.

2. Description of the Related Art

Since liquid crystal display devices can be reduced in thickness and weight, their application use has been extended to various fields including large-scaled devices such as television, and mobile phones and DSC (Digital Still Camera). On the other hand, the liquid crystal display devices have a problem of view angle characteristics. The view angle characteristic is a phenomenon in which brightness or chromaticity changes between a case in which a screen is observed from the front and a case in which the screen is observed in an oblique direction. For the view angle characteristics, an IPS (In Plane Switching) system for operating liquid crystal molecules by electric field in a horizontal direction has excellent characteristics.

A conventional liquid crystal display device includes a TFT substrate having a pixel electrode, thin film transistors (TFT), etc. formed in a matrix; a counter substrate disposed in facing relation to the TFT substrate and having a color filter, etc. formed at portions corresponding to the pixel electrodes of the TFT substrate; and liquid crystals put between the TFT substrate and the counter substrate. Images are formed by controlling the transmittance of light by liquid crystal molecules for every pixel.

However, in the conventional liquid crystal display devices described above, the TFT substrate and the counter substrate have to be positioned accurately. Therefore, the positioning step drives up the manufacturing cost of the liquid crystal display device. Further, since complete positioning is not possible between the TFT substrate and the counter substrate, a positioning margin is taken in view of design. To take the margin, since it is necessary to increase the area for a black matrix, this reduces the transmittance of a liquid crystal display panel to cause loss in the brightness of a screen. Further, formation of a screen having high fineness is also limited.

Then, a technique of forming a color filter on a TFT substrate has been developed. If the color filter is fabricated into the TFT substrate, the pixel electrode and the color filter can be positioned, for example, by a photolithographic step. Therefore, the accuracy is outstandingly higher compared with that in positioning between the TFT substrate and the counter substrate. Further, since the step of forming the color filter requires an identical step both in a case in which the color film is formed on the counter substrate and in a case in which the color film is formed on the TFT substrate, the number of step of forming the color filter is not increased.

Accordingly, by using a system for fabricating a color filter to a TFT substrate (color filter on array: hereinafter referred to as COA), manufacturing cost can be reduced, and the screen brightness can be improved by improving the transmittance of the liquid crystal display device and a screen having high fineness can be achieved.

On the other hand, the liquid crystal display device involves a phenomenon of DC afterimage. This is a phenomenon that electric charges are accumulated on an alignment film when a certain image is displayed for a predetermined time and the image is observed as if it were burnt to the screen for a certain time. The lasting time of the DC afterimage can be shortened by reducing the electric resistance of the alignment film.

Since a backlight is used in the liquid crystal display device, the electric resistance of the alignment film during operation can be reduced by using a photoconductive material for the alignment film. Accordingly, a photoconductive alignment film is used in many recent liquid crystal display devices. Materials showing a photoconductive property as the alignment film include, for example, SE 6414 manufactured by Nissan Chemical Co.

However, in the COA, since the color filter is formed on the side of the backlight with respect to the alignment film, the intensity of a light from backlight reaching the alignment film is less than that in the conventional device. Accordingly, no sufficient photoconductivity can be provided to the alignment film and the resistance of the alignment film during operation cannot be reduced sufficiently. Accordingly, the DC afterimage causes a serious problem with the COA.

The alignment film absorbs more light at shorter wavelength because light at a short wavelength contributes to the photoconductivity. As the transmittance lowers at a short wavelength, there occurs a phenomenon that more light on the side of longer wavelength transmits through the alignment film or transmits through the liquid crystal display panel, and the image is shifted to the side of red color.

JP-A-2011-237571 describes a configuration for increasing the thickness of color filters in a COA in the order of a red filter, a green filter, and a blue filter, thereby preventing shifting of a screen image to the red color. Alternatively, it describes another configuration for increasing the size of pixels in the order of a red filter, a green filter, and a blue filter, thereby preventing the screen image from shifting to the red color.

SUMMARY OF THE INVENTION

In JP-A-2011-237571, it is necessary to change the size of pixels for every pixels of red, green, and blue, or change the thickness of the color filter. Then, when the absorption spectrum of the color filter changes for every kind or every material of the color filter, it is necessary to change the ratio of the thickness of each of color filters or the ratio of area of each of color filters for every kind or every material of color filter, which increases process load.

Figure 9:
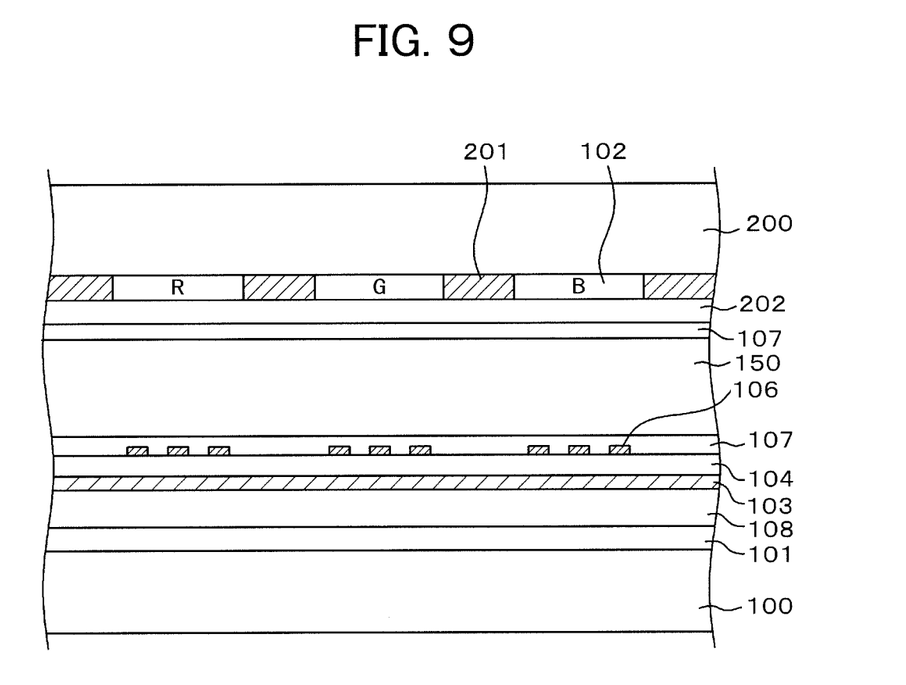
FIG. 9 is a cross sectional view of a liquid crystal display panel in a first conventional embodiment.
Figure 10:
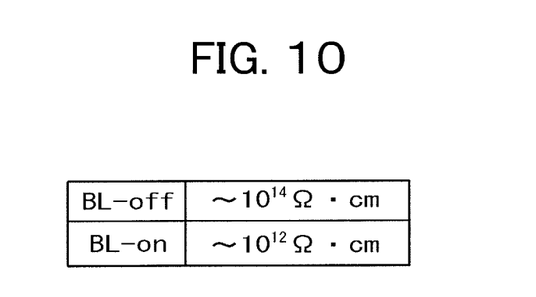
FIG. 10 is a table illustrating a photoelectric effect of an alignment film in the first conventional embodiment.

FIG. 9 is a cross sectional view of a conventional liquid crystal display panel in which a color filter 102 is formed on the side where a counter substrate 200 is provided. FIG. 10 is a table for comparing the specific resistivity of an alignment film 107 between a case where a backlight is turned off and a case where it is turned on in the liquid crystal display panel illustrated in FIG. 9. In FIG. 9, since the color filter 102 is formed on the side where the counter substrate 200 is provided, there is no difference in the photoconductive characteristic to the specific resistivity of the alignment film 107 due to the color filter 102.

In FIG. 10, the specific resistivity of the alignment film SE6414 is $10^{14}$ Ωcm when the backlight is turned off and the specific resistivity thereof is $10^{12}$ Ωcm when the backlight is turned on.

Figure 11:
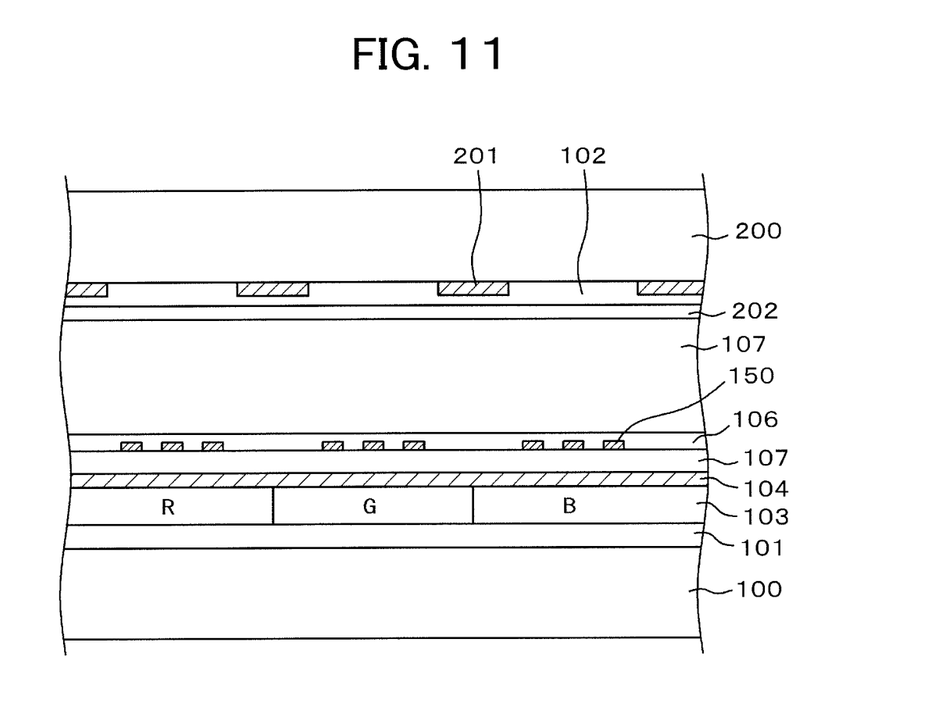
FIG. 11 is a cross sectional view of a liquid crystal display panel of a second conventional embodiment.

FIG. 11 is a cross sectional view of a conventional liquid crystal display panel in which a color filter 102 is formed on the side where a TFT substrate 100 is provided. In FIG. 11, the color filter 102 is formed on an interconnect layer 101 of the TFT substrate 100, and a counter electrode 103, a pixel electrode 106, alignment film 107, etc. are formed thereon. In FIG. 11, a black matrix 201, an overcoat film 202, and an alignment film 107 are formed on a counter substrate 200 but the color filter 102 is not formed.

In FIG. 11, a backlight is applied to the back of the TFT substrate 100. In this configuration, since the light from the backlight is absorbed by the color filter 102, no sufficient photoconductivity can be provided to the alignment film 107. Further, since the photoconductivity of the alignment film 107 has the wavelength dependence, the photoconductive property of the alignment film 107 is different for every pixel to cause color shift in the screen.

Figure 12:
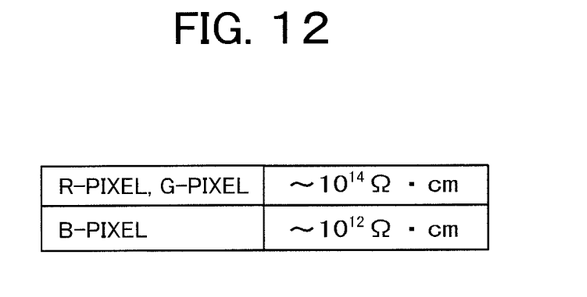
FIG. 12 is a table illustrating a photoelectric effect of an alignment film in the second conventional embodiment.

FIG. 12 is a table for evaluating the photoconductive effect for every color when the backlight is applied. In the alignment film of FIG. 12, the specific resistivity scarcely changes even when the film is irradiated with the backlight in a case of a red pixel and a green pixel, whereas the specific resistivity is decreased by two digits for the blue pixel. This shows that the color shift occurs when the afterimage is caused.

The present invention intends to prevent occurrence of afterimage caused by accumulation of electric charges on the alignment film in a COA where a color filter is disposed on the side where a TFT substrate 100 is provided. The present invention further intends to achieve a configuration for preventing color shift of an afterimage in the COA without changing the thickness of the color filter 102 or changing the size of the pixel for every color.

To overcome the problems described above, the present invention provides the following specific configurations.

(1) A liquid crystal display device includes: a TFT substrate; a color filter; a counter electrode; an interlayer insulation film; a pixel electrode; an alignment film; a liquid crystal layer; a counter substrate; and a Si semiconductor layer, the color filter, the counter electrode, the interlayer insulation film, the pixel electrode, and the alignment film being formed on the side where the TFT substrate is provided, the counter substrate being disposed in facing relation to the TFT substrate with the liquid crystal layer put between the counter substrate and the TFT substrate. The Si semiconductor layer is formed between the pixel electrode and the interlayer insulation layer.

(2) A liquid crystal display device includes: a TFT substrate; a color filter; a counter electrode; an interlayer insulation film; a pixel electrode; an alignment film; a liquid crystal layer; a counter substrate; and a Si semiconductor layer, the color filter, the counter electrode, the interlayer insulation film, the pixel electrode, and the alignment film being formed on the side where the TFT substrate is provided, the counter substrate being disposed in facing relation to the TFT substrate with the liquid crystal layer put between the counter substrate and the TFT substrate. The Si semiconductor layer is formed between the pixel electrode and the alignment film.

(3) A liquid crystal display device includes: a TFT substrate; a counter electrode; an interlayer insulation film; a pixel electrode; an alignment film; a liquid crystal layer; a counter substrate having a color filter formed therein; and a Si semiconductor layer, the counter electrode, the interlayer insulation film, the pixel electrode, and the alignment film being formed on the side where the TFT substrate is provided, the counter substrate being disposed in facing relation to the TFT substrate with the liquid crystal layer put between the counter substrate and the TFT substrate. The Si semiconductor layer is formed between the pixel electrode and the interlayer insulation film.

(4) A liquid crystal display device includes: a TFT substrate; a counter electrode; an interlayer insulation film; a pixel electrode; an alignment film; a liquid crystal layer; a counter substrate having a color filter formed therein; and a Si semiconductor layer, the counter electrode, the interlayer insulation film, the pixel electrode, and the alignment film being formed on the side where the TFT substrate is provided, the counter substrate being disposed in facing relation to the TFT substrate with the liquid crystal layer put between the counter substrate and the TFT substrate. The Si semiconductor layer is formed between the pixel electrode and the alignment film.

(5) In a liquid crystal display device, an oxide semiconductor having a resistance equal to that of the Si semiconductor layer is formed instead of the Si semiconductor layer.

According to the invention, DC afterimage can be suppressed in an IPS liquid crystal display device using a COA system having a color filter formed on the side where a TFT substrate is provided. Further, in the liquid crystal display device as in the usual device having the color filter formed on the side where the counter electrode is provided, since electric charges accumulated on the alignment film can escape not relying on the photoconductive effect, color shift of the DC afterimage can be suppressed. The alignment film to be used may be either a rubbing alignment film or an optical alignment film, and the invention is not restricted in view of the material and the alignment process.

DESCRIPTION OF THE PREFERRED EMBODIMENTS

The present invention is to be described specifically by way of the following preferred embodiments.

First Embodiment

Figure 1:
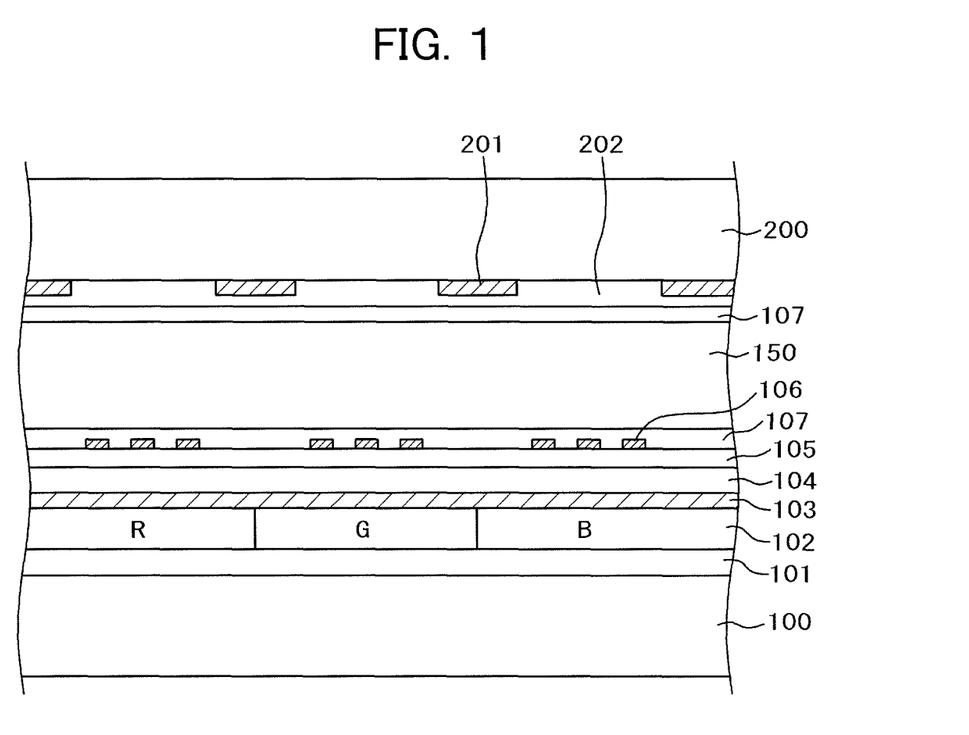
FIG. 1 is a cross sectional view of a liquid crystal display panel of a first embodiment.

FIG. 1 is a cross sectional view of a liquid crystal display panel according to a first embodiment of the invention. FIG. 1 illustrates an IPS liquid crystal display panel which is a COA type liquid crystal display panel having a color filter 102 formed on the side where a TFT substrate 100 is provided. In FIG. 1, an interconnect layer 101 is formed on a TFT substrate 100 formed of glass. The interconnect layer 101 includes TFTs, video signal lines, scanning lines, etc.

In FIG. 1, a red color filter 102, a green color filter 102, and a blue color filter 102 are formed for every pixel on the interconnect layer 101. A counter electrode 103 comprising ITO (Indium Tin Oxide) formed as a flat solid electrode is formed on the color filter 102. An interlayer insulation film 104 comprising SiN is formed on the counter electrode 103. The SiN film is formed by a low temperature CVD at about 200° C.

A Si semiconductor layer 105 is formed on the interlayer insulation film 104, and this is a feature of the invention. The Si semiconductor layer 105 may be an intrinsic semiconductor or a semiconductor doped with P or the like. The Si semiconductor layer 105 has a thickness of 5 nm to 100 nm.

A comb-shaped pixel electrode 106 comprising ITO is formed on the Si semiconductor 105, and an alignment film 107 is formed thereover. If the resistance of the alignment film 107 is high, electric charges remain for a long time on the alignment film 107, which causes an afterimage. For erasing the afterimage in an early stage, the electric charges can escape in an early stage by reducing the resistance of the Si semiconductor layer 105 formed under the alignment film 107 in addition to reduction in the resistance of the alignment film 107.

In FIG. 1, a counter substrate 200 is disposed in facing relation to the TFT substrate 100 with a liquid crystal layer 150 put between them. A black matrix 201 is formed on the counter substrate 200 formed of glass, and an overcoat film 202 is formed so as to cover the black matrix 201. The color filter 102 is not formed between a black matrix 201 and another black matrix 201. An alignment film 107 is formed on the overcoat film 202.

Figure 2:
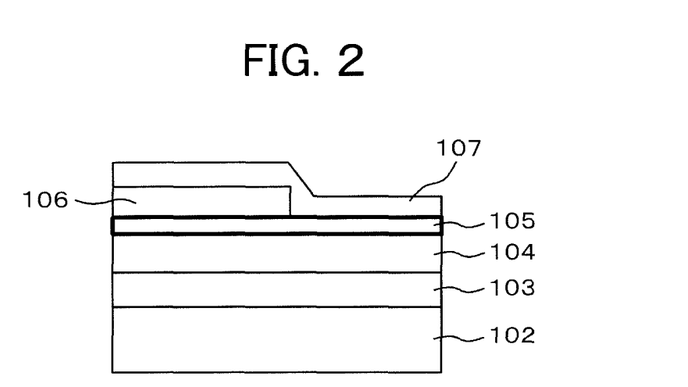
FIG. 2 is a cross sectional view illustrating the operation of the first embodiment.

FIG. 2 is an enlarged cross sectional view for explaining the operation of the configuration illustrated in FIG. 1. In FIG. 2, a counter electrode 103 comprising ITO is formed as a flat solid electrode on a color filter 102, an interlayer insulation film 104 comprising SiN is formed thereon, a semiconductor layer 105 is formed thereon, a comb-shaped pixel electrode 106 comprising ITO is further formed thereon, and an alignment film 107 is formed so as to cover the pixel electrode 106.

Since the interlayer insulation film 104 comprising SiN is formed by CVD after formation of the color filter 102 comprising an organic material, it is formed by a low temperature CVD at about 200° C. for preventing denaturation of the color filter 102. The semiconductor layer 105 formed over the interlayer insulation film 104 comprises a-Si. Since the interlayer insulation film 104 comprising SiN and the Si semiconductor layer 105 are formed continuously by CVD, this decreases burden on the process even when the present invention is applied.

Since the resistance of the alignment film 107 is as high as about $10^{14}$ Ωcm, it takes a long time for electric charge accumulated on the alignment film 107 to escape to the pixel electrode 106, etc. In FIG. 2, the Si semiconductor layer 105 is formed under the alignment film 107 and even if the Si semiconductor layer 105 is an intrinsic semiconductor, the specific resistivity thereof is lower by one digit or more than that of the material for the alignment film. Accordingly, even when no sufficient light from a back light is applied to the alignment film 107 and the photoelectric effect cannot be provided sufficiently, the electric charges accumulated on the alignment film 107 can escape by way of the underlying Si semiconductor layer 105 to the pixel electrode 106 and the afterimage can be erased in an early stage.

Since the thickness of the alignment film 107 is about 50 to 70 nm, the resistance of the alignment film 107 in the direction of the thickness is not high. Accordingly, electric charges moving from the surface of the alignment film 107 can move through the underlying Si semiconductor layer 105 to the pixel electrode 106, resulting in early erasure of the afterimage. The erasure time of the afterimage can be controlled by the extent of the resistance of the Si semiconductor layer 105 and this can be controlled by the thickness of the Si semiconductor layer 105 and whether P or the like is doped or not to the Si semiconductor layer 105.

In the invention, since the resistance value of the alignment film per se is not reduced by the photoelectric effect, it is not necessary that the photoelectric effect of the alignment film is large. When the resistance value is reduced relying on the photoelectric effect, since the color filter has spectral characteristics, wavelength dependence occurs in the resistance of the alignment film to cause color shift in the afterimage. Since the invention does not rely on the photoelectric effect of the alignment film, color shift is not caused in the afterimage. Further, the material for the alignment film can be selected optimally in accordance with the purpose of the alignment film with no consideration for on photoelectric effect.

The configuration of this embodiment is different from the conventional configuration in that the Si semiconductor layer 105 is formed after formation of the interlayer insulation film 104 comprising SiN and then the pixel electrode 106 is formed. Since SiN is formed by so-called low temperature CVD and the Si semiconductor layer 105 is also formed by CVD, the Si semiconductor layer 105 can be formed continuously after deposition of the interlayer insulation film 104 comprising SiN by CVD. Accordingly, this decreases burden on the process.

Second Embodiment

Figure 3:
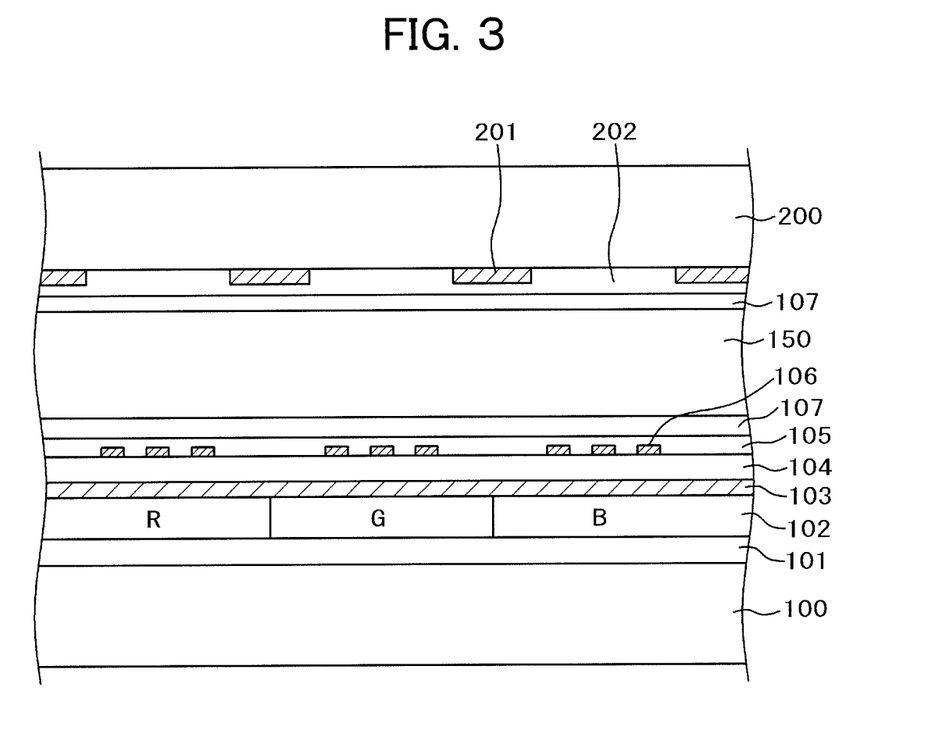
FIG. 3 is a cross sectional view of a liquid crystal display panel of a second embodiment.

FIG. 3 is a cross sectional view of a liquid crystal display panel according to a second embodiment of the invention. A color filter 102 is formed on the side where a TFT substrate 100 provided and not formed on the side where a counter substrate 200 is provided. A configuration of FIG. 3 is different from the configuration of FIG. 1 in that an interlayer insulation film 104 comprising SiN is formed on a counter electrode 103 formed as a flat solid electrode, and a comb-shaped pixel electrode 106 is formed thereon and a Si semiconductor layer 105 is formed over a pixel electrode 106. Then, an aliment film 107 is formed on the Si semiconductor 105.

In FIG. 3, electric charges accumulated on the alignment film 107 which cause the afterimage escape to the side where the pixel electrode 106 is provided by way of a Si semiconductor layer 105 formed under the alignment film 107. Since the specific resistivity of the Si semiconductor layer 105 is lower by one digit or more than that of the alignment film 107, electric charges accumulated on the alignment film 107 are erased in an early stage through the Si semiconductor layer 105 and also the afterimage is erased in an early stage.

Figure 4:
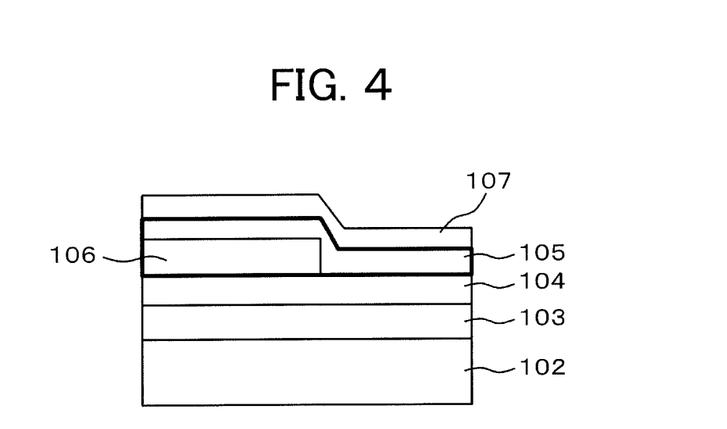
FIG. 4 is a cross sectional view illustrating the operation of the second embodiment.

FIG. 4 is an enlarge schematic cross sectional view for explaining the operation of the constitution of FIG. 3. In FIG. 4, a counter electrode 103 comprising ITO is formed as a flat solid electrode on a color filter 102, an interlayer insulation film 104 comprising SiN is formed thereon, and a pixel electrode 106 is formed further thereon. After patterning of the pixel electrode 106 into a comb-shaped electrode by photolithography, a Si semiconductor layer 105 is formed.

The Si semiconductor layer 105 has a thickness of about 5 to 100 nm. Such a thickness that causes entire step disconnection by the pixel electrode 106 comprising ITO may cause a problem in terms of operation. However, partial step disconnection may be allowed. It may suffice that the pixel electrode 106 and the Si semiconductor 105 are in electric conduction.

Since the resistance of the alignment film 107 is as high as about $10^{14}$ Ωcm, it takes a long time for electric charges formed on the alignment film 107 to escape to the pixel electrode 106, etc. In FIG. 4, a Si semiconductor layer 105 is formed under the alignment film 107 and even if the Si semiconductor layer 105 is an intrinsic semiconductor, the specific resistivity of the Si semiconductor layer 105 is lower by one digit or more than that of the material for the alignment film. Accordingly, even when no sufficient light from a backlight is applied to the alignment film 107 and the photoelectric effect cannot be provided sufficiently, electric charges accumulated on the alignment film 107 can escape by way of the underlying Si semiconductor layer 105 to the pixel electrode 106 and the afterimage can be erased in an early stage. The erasure time of the afterimage can be controlled by controlling the extent of the resistant of the Si semiconductor layer 105 and this can be controlled by the thickness of the Si semiconductor layer 105 and whether P or the like is doped to the Si semiconductor layer 105.

Also in this embodiment, since escape of the electric charges accumulated on the alignment film does not rely on the reduction of the resistance by the photoelectric effect of the alignment film per se but relies on the Si semiconductor layer formed to the underlying layer, color shift of the afterimage under the effect of the spectral characteristic of the color filter can be suppressed.

In this embodiment, after the interlayer insulation film 104 is formed, the pixel electrode 106 is formed by depositing ITO and patterning the same by using a photolithography. Subsequently, the Si semiconductor layer 105 is deposited by CVD. That is, after the interlayer insulation film 104 is deposited by CVD and an ITO film is formed as the pixel electrode 106, the TFT substrate 100 is taken out from a vacuum atmosphere into atmospheric air and ITO is patterned. Then, the Si semiconductor layer 105 is deposited again by CVD.

As described above, the burden on the process is larger in the second embodiment compared with that in the first embodiment. However, the advantageous effect is identical.

Third Embodiment

Figure 5:
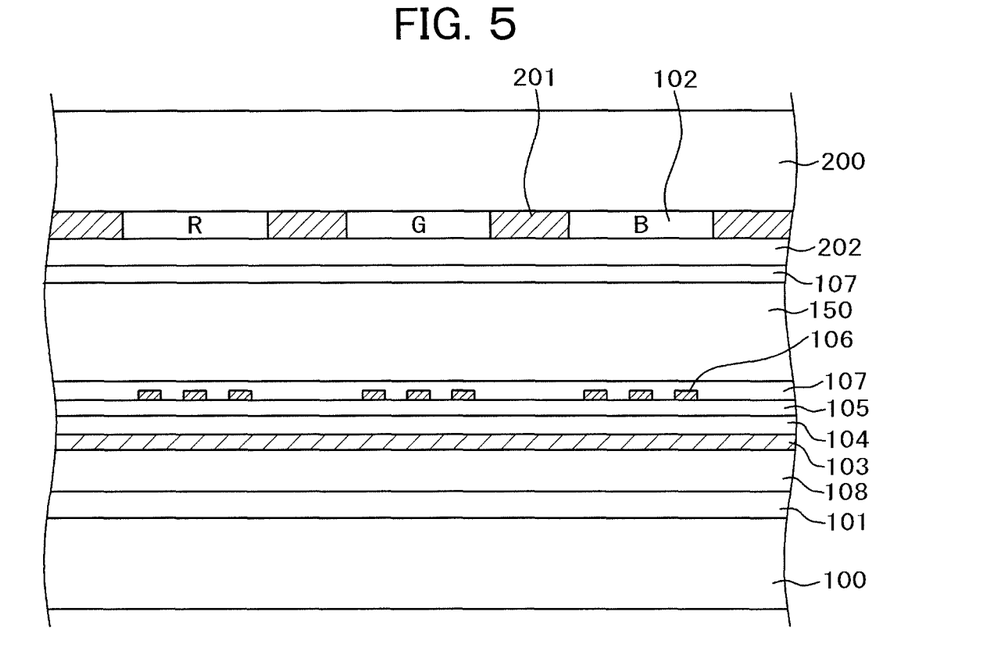
FIG. 5 is a cross sectional view of a liquid crystal display panel of a third embodiment.

FIG. 5 is a cross sectional view illustrating a third embodiment according to the invention. In FIG. 5, an interconnect layer 101 is formed on a TFT substrate 100 formed of glass. The interconnect layer 101 includes TFTs, video signal lines, scanning lines, etc. An organic passivation film 108 is formed on the interconnect layer 101, and a counter electrode 103 comprising ITO is formed as a flat solid electrode thereon. An interlayer insulation film 104 comprising SiN is formed on the counter electrode 103 and a Si semiconductor layer 105 is formed thereon. A comb-shaped pixel electrode 106 is formed on the Si semiconductor layer 105, and an alignment film 107 is formed so as to cover the pixel electrode. While SiN that forms the interlayer insulation film 104 is formed by CVD, since the insulation film is formed after the organic passivation film 108 is formed, this is formed by a so-called low temperature CVD at about 200° C.

In FIG. 5, a black matrix 201 and a color filter 102 are formed on a counter substrate 200 formed of glass, and an overcoat film 202 is formed so as to cover the black matrix 201 and the color filter 102. An alignment film 107 is formed so as to cover the overcoat film 202.

In the configuration of FIG. 5, the color filter 102 is formed to the counter substrate 200 as in the conventional device. That is, light from a backlight is not shielded by the color filter 102. However, also in the conventional embodiment illustrated in FIG. 5, electric charges are accumulated on the alignment film 107 to cause an afterimage. In the conventional device, the resistance of the alignment film 107 is decreased by using a material having a photoelectric effect for the alignment film 107.

However, also in the conventional device, there is a limit to the reduction of the resistance of the alignment film 107 by the photoelectric effect. Then, a two-layered structure was adopted for the alignment film 107 by using a layer of an alignment film having high alignment property but having a high resistivity as an upper layer and using an alignment material having a resistivity lower than that of the upper layer as a lower layer. However, it is necessary in this method to synthesize a material suitable to a process of forming two-layered alignment film by coating the material for the alignment film for once, and there was a problem of impairing the degree of freedom in the selection of the material for the alignment film.

In the invention illustrated in FIG. 5, a Si semiconductor layer 105 is formed under a comb-shaped pixel electrode 106 and an alignment film 107 is formed above the pixel electrode. Even when the Si semiconductor layer 105 is an intrinsic semiconductor, the specific resistivity of the semiconductor layer is lower by one digit or more than the specific resistivity of the alignment film. Accordingly, electric charges accumulated on the alignment film 107 can escape in an early stage to the pixel electrode 106 without the production of the photoelectric effect in the alignment film 107. That is, the electric charges accumulated on the alignment film 107 can stably escape in an early stage to the pixel electrode, etc. irrespective of the intensity of light from the backlight.

How the electric charges accumulated on the alignment film 107 can escape to the pixel electrode 106 in an early stage is the same as described with reference to the schematic cross sectional view of FIG. 2. Further, also the thickness, the specific resistivity, and whether doping is necessary or not to the Si semiconductor layer 105 are as has been described with reference to FIG. 2 for the first embodiment. Therefore, according to this embodiment, the afterimage can be erased stably in an early stage even in a liquid crystal display panel having the color filter 102 formed on the side where the counter substrate 200 is provided.

Also in this embodiment, since SiN that forms the interlayer insulation film 104 is formed by CVD and the Si semiconductor layer 105 is also formed by CVD, the Si semiconductor layer 105 can be formed continuously after deposition of SiN by CVD. Accordingly, this decreases burden on the process.

Fourth Embodiment

Figure 6:
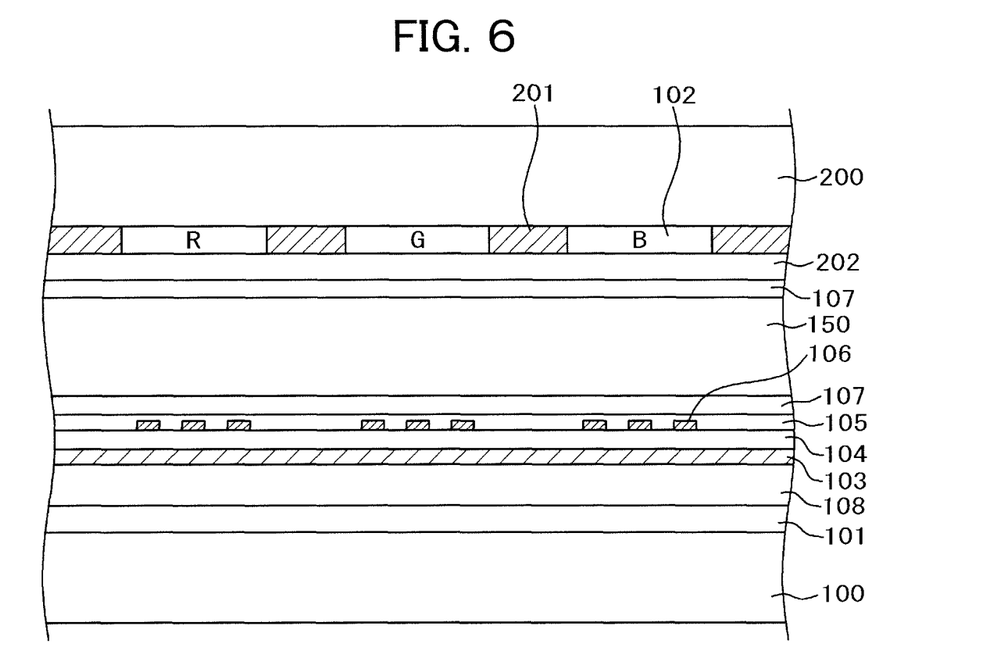
FIG. 6 is a cross sectional view of a liquid crystal display panel of a fourth embodiment.

FIG. 6 is a cross sectional view of a liquid crystal display panel according to a fourth embodiment of the invention. In FIG. 6, a color filter 102 is formed on the side where a counter substrate 200 is provided as in the conventional case in the same manner as in FIG. 5. The configuration illustrated in FIG. 6 is different from the configuration illustrated in FIG. 5 in view of the cross sectional view showing the vicinity of a pixel electrode 106. In FIG. 6, a comb-shaped pixel electrode 106 is formed on an interlayer insulation film 104. A Si semiconductor layer 105 is formed over the pixel electrode 106, and an alignment film 107 is formed on the Si semiconductor layer 105.

Also in this configuration, since the specific resistivity of the Si semiconductor layer 105 is lower by one digit or more than the specific resistivity of the alignment film 107, electric charges accumulated on the alignment film 107 can escape through the Si semiconductor layer 105 to the pixel electrode 106, etc. Accordingly, the afterimage can be erased in an early stage.

How the electric charges accumulated on the alignment film 107 escape to the pixel electrode 106 in the configuration of FIG. 6 is the same as described in the second embodiment with reference to FIG. 4. Further, also the forming process in the vicinity of the pixel electrode 106 is as has been described above with reference to FIG. 4. Since this embodiment has no configuration of using the two-layered structure for the alignment film 107 and utilizing the photoelectric effect, the electric charges accumulated on the alignment film 107 can escape in an early stage to the pixel electrode 106 irrespective of the intensity of light from a backlight and the effect of the afterimage can be erased in an early stage.

In the embodiments described above, the counter electrode 103 is formed as a flat solid electrode in the underlying layer, the interlayer insulation film 104 is formed thereon, and the comb-shaped pixel electrode 106 is formed thereon. However, the invention is not restricted only to such embodiments but is applicable also to a configuration in which the pixel electrode 106 is formed as a flat solid electrode in the underlying layer, the interlayer insulation film 104 is formed thereon, and the comb-shaped counter electrode 103 is formed thereon.

Fifth Embodiment

Figure 7:
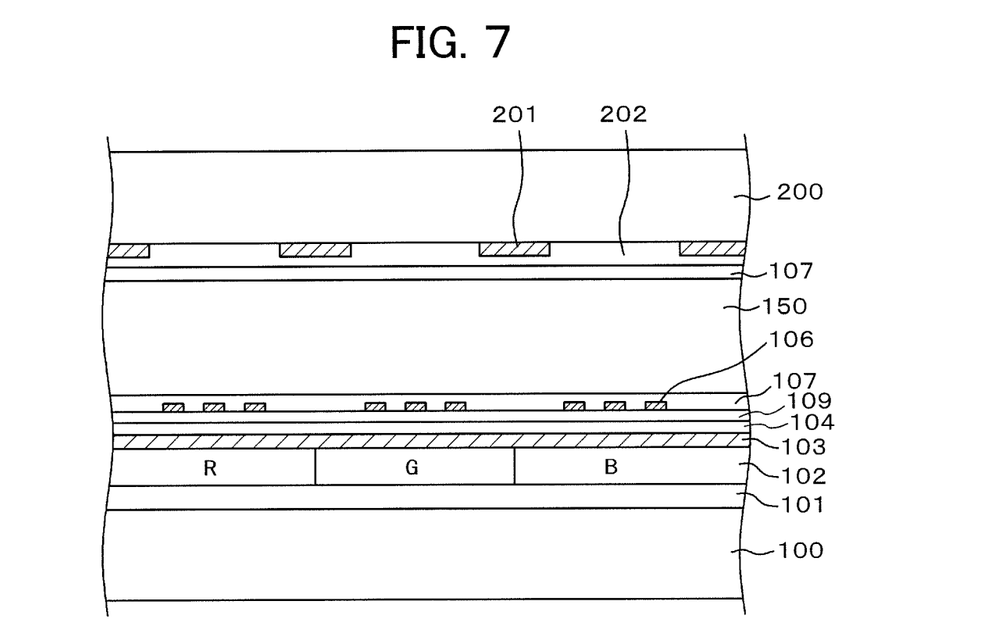
FIG. 7 is a cross sectional view of a liquid crystal display panel of a fifth embodiment.

FIG. 7 is a cross sectional view of a liquid crystal display panel according to a fifth embodiment of the invention. A color filter 102 is formed on the side where a TFT substrate 100 is provided but not formed on the side where a counter substrate 200 is provided. FIG. 7 is different from FIG. 1 in that an oxide semiconductor layer 109 showing a resistance equal to that of the Si semiconductor layer is formed instead of the Si semiconductor layer formed under an alignment film 107. Examples of the oxide semiconductor include ITO and the like. Erasure time of the afterimage can be controlled by the extent of the resistance of the oxide semiconductor layer 109 and this can be controlled by the thickness of the oxide semiconductor layer 109 and an oxygen concentration during film formation.

In the embodiment illustrated in FIG. 7, the oxide semiconductor layer 109 formed on the interlayer insulation film 104 comprises ITO. Since the oxide semiconductor layer 109 and the pixel electrode 106 are formed continuously by sputtering, this decreases burden on the process even when the invention is applied.

Sixth Embodiment

Figure 8:
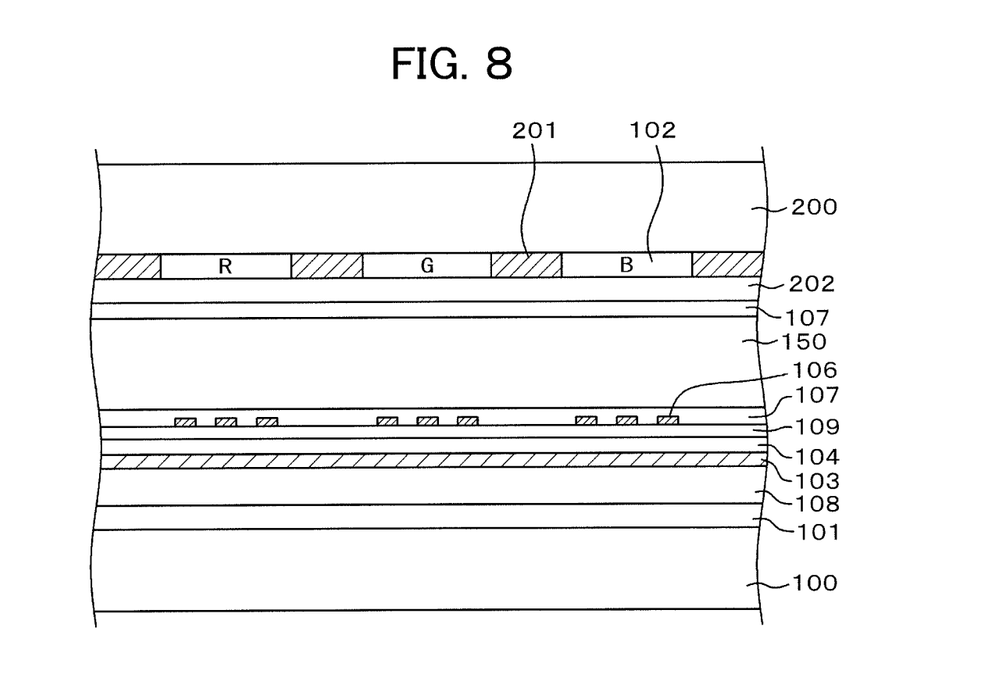
FIG. 8 is a cross sectional view of a liquid crystal display panel of a sixth embodiment.

FIG. 8 is a cross sectional view of a liquid crystal display panel according to a sixth embodiment of the invention. In FIG. 8, a color filter 102 is formed on the side where a counter substrate 200 is provided as in FIG. 5. The embodiment illustrated in FIG. 8 is different from the embodiment illustrated in FIG. 5 in that an oxide semiconductor layer 109 showing a resistance equal to that of the Si semiconductor layer is formed instead of the Si semiconductor layer formed under an alignment film 107. Examples of the oxide semiconductor include ITO and the like in the same manner as in FIG. 7. How the electric charges accumulated in the alignment film 107 can escape to the pixel electrode 106 in an early stage is the same as described with reference to the schematic cross sectional view shown in FIG. 2. The film thickness, the specific resistivity, the film forming conditions etc. for the oxide semiconductor layer 109 are identical with those explained with reference to FIG. 7 for the fifth embodiment. Therefore, according to this embodiment, the afterimage can be erased stably in an early stage also in a liquid crystal panel having the color filter 102 formed on the side where the counter substrate 200 is provided as in the usual device.

In the embodiments described above, the material for the alignment film may be either a rubbing alignment film or an optical alignment film, and the invention is applicable with no restriction to material and alignment process.

What is claimed is:

1. A liquid crystal display device comprising:
    a TFT substrate;
    a counter electrode;
    an interlayer insulation film;
    a pixel electrode;
    an alignment film;
    a liquid crystal layer;
    a counter substrate having a color filter formed therein; and
    a Si semiconductor layer,
    wherein the counter electrode, the interlayer insulation film, the pixel electrode, and the alignment film being formed on the side where the TFT substrate is provided,
    the interlayer insulation film is provided between the pixel electrode and the counter electrode,
    the counter substrate is disposed in facing relation to the TFT substrate with the liquid crystal layer put between the counter substrate and the TFT substrate,
    the Si semiconductor layer is formed between the pixel electrode and the interlayer insulation film,
    the Si semiconductor layer directly contacts with the pixel electrode,
    wherein the counter electrode is formed between the interlayer insulation film and the TFT substrate, and
    wherein an interconnect layer including TFTs, video signal lines, and scanning lines is formed between the counter electrode and the TFT substrate.

2. The liquid crystal display device according to claim 1, wherein
    the Si semiconductor layer comprises a-Si.

3. The liquid crystal display device according to claim 1, wherein
    the Si semiconductor layer has a thickness of 5 nm to 100 nm.

4. A liquid crystal display device according to claim 1, wherein
    the Si semiconductor layer is formed between the alignment film and the interlayer insulation film.

5. The liquid crystal display device according to claim 1, wherein
    the Si semiconductor layer is commonly formed over a plurality of pixels.

* * * * *